United States Patent [19]

Cseh et al.

[11] 4,070,353
[45] Jan. 24, 1978

[54] DICARBOXYLIC ACID ESTER DIAZO PIGMENTS

[75] Inventors: Georg Cseh, Basel; Karl Ronco, Riehen, both of Switzerland

[73] Assignee: Ciba-Geigy Corporation, Ardsley, N.Y.

[21] Appl. No.: 655,293

[22] Filed: Feb. 4, 1976

Related U.S. Application Data

[63] Continuation of Ser. No. 458,729, April 8, 1974, abandoned.

[30] Foreign Application Priority Data

Apr. 18, 1973 Switzerland ............... 5639/73

[51] Int. Cl.² .............................................. C09B 33/16
[52] U.S. Cl. .................................. 260/176; 106/288 Q; 260/208
[58] Field of Search ........................................ 260/176

[56] References Cited

FOREIGN PATENT DOCUMENTS

| | | | |
|---|---|---|---|
| 2,103,765 | 8/1971 | Germany | 260/176 |
| 359,498 | 2/1962 | Switzerland | 260/176 |
| 452,750 | 5/1968 | Switzerland | 260/176 |

Primary Examiner—Charles F. Warren
Attorney, Agent, or Firm—Vincent J. Cavalieri

[57] ABSTRACT

Diazo pigments of the formula

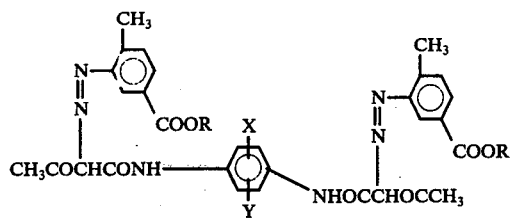

wherein R denotes an alkyl, cycloalkyl, aralkyl, aryl or heterocyclic radical, X denotes a hydrogen or halogen atom, an alkyl or alkoxy group containing 1 to 4 carbon atoms, or a nitro, cyano, trifluoromethyl or carboxylic acid ester group, and Y denotes a hydrogen or halogen atom, an alkyl or alkoxy group containing 1 to 4 carbon atoms or a nitro, cyano, trifluoromethyl or carboxylic acid ester group, are useful for coloring plastics and printing inks in fast yellow to orange shades.

7 Claims, No Drawings

DICARBOXYLIC ACID ESTER DIAZO PIGMENTS

This is a continuation of application Ser. No. 458,729 filed on Apr. 8, 1974, now abandoned.

It has been found that new, valuable disazo pigments of the formula

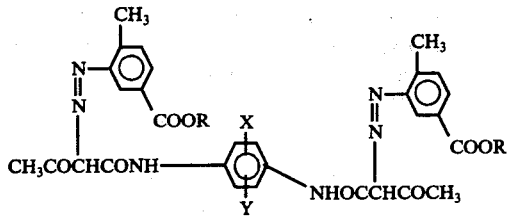

wherein R denotes an alkyl, cycloalkyl, aralkyl, aryl or hterocyclic radical, X denotes a hydrogen or halogen atom, an alkyl or alkoxy group containing 1 to 4 carbon atoms, or a nitro, cyano, trifluoromethyl or carboxylic acid ester group, and Y denotes a hydrogen or halogen atom, an alkyl or alkoxy group containing 1 to 4 carbon atoms or a nitro, cyano, trifluoromethyl or carboxylic acid ester group, are obtained when a diazo or diazoamino compound of an amine of the formula

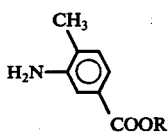

is coupled with a bis-acetoacetyl-phenylenediamine of the formula

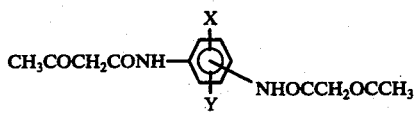

in the molar ratio of 2:1.

Diazo pigments of particular interest are those of the formula

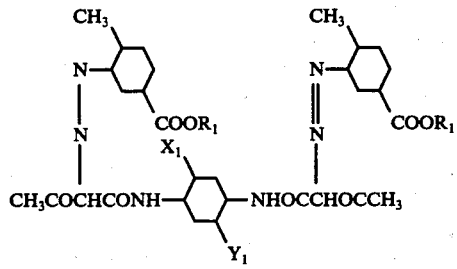

wherein $R_1$ denotes an alkyl group containing 1 - 6 carbon atoms which is optionally substituted by halogen atoms or alkoxy groups containing 1 - 4 carbon atoms, a cycloalkyl group containing 5 - 6 carbon atoms, an aralkyl group or a phenyl group which is optionally substituted by halogen atoms, alkyl or alkoxy groups containing 1 - 4 carbon atoms or alkoxycarbonyl groups containing 2 - 6 carbon atoms or alkanoylamino groups containing 1 - 4 carbon atoms, $X_1$ denotes a hydrogen or halogen atom or an alkyl or alkoxy group containing 1 - 4 carbon atoms and $Y_1$ denotes a hydrogen or halogen atom or an alkyl or alkoxy group containing 1 - 4 carbon atoms.

The diazo components used are preferably those of the formula

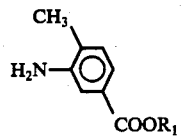

wherein $R_1$ has the indicated meaning.

As examples there may be mentioned: 3-Amino-4-methyl-benzoic acid methyl ester, 3-amino-4-methyl-benzoic acid ethyl ester, 3-amino-4-methyl-benzoic acid n-propyl ester, 3-amino-4-methyl-benzoic acid iso-propyl ester, 3-amino-4-methyl-benzoic acid n-butyl ester, 3-amino-4-methyl-benzoic acid tert.butyl ester, 3-amino-4-methyl-benzoic acid β-chloroethyl ester, 3-amino-4-methyl-benzoic acid γ-chloropropyl ester, 3-amino-4-methyl-benzoic acid acrylic ester, 3-amino-4-methyl-benzoic acid phenyl ester, 3-amino-4-methyl-benzoic acid 2'-chloro-phenyl ester, 3-amino-4-methyl-benzoic acid 3'-chloro-phenyl ester, 3-amino-4-methyl-benzoic acid 4'-bromo-phenyl ester, 3-amino-4-methyl-benzoic acid 2',4'-dichloro-phenyl ester, 3-amino-4-methyl-benzoic acid 3',4'-dichloro-phenyl ester, 3-amino-4-methyl-benzoic acid 2',4',5'-trichloro-phenyl ester, 3-amino-4-methyl-benzoic acid 2',4',6'-trichloro-phenyl ester, 3-amino-4-methyl-benzoic acid 2',3',4',5',6'-pentachloro-phenyl ester, 3-amino-4-methyl-benzoic acid 2'-methyl-phenyl ester, 3-amino-4-methyl-benzoic acid 3'-methyl-phenyl ester, 3-amino-4-methyl-benzoic acid 4'-methyl-phenyl ester, 3-amino-4-methyl-benzoic acid 3', 5'-dimethyl-phenyl ester, 3-amino-4-methyl-benzoic acid 4'-tert.butyl-phenyl ester, 3-amino-4-methyl-benzoic acid 4'-iso-amyl-phenyl ester, 3-amino-4-methyl-benzoic acid 2'-methoxy-phenyl ester, 3-amino-4-methyl-benzoic acid 4'-methoxy-phenyl ester, 3-amino-4-methyl-benzoic acid 2'-methyl-4'-chloro-phenyl ester, 3-amino-4-methyl-benzoic acid 2'-methyl-6'-chloro-phenyl ester, 3-amino-4-methyl-benzoic acid 3'-methyl-4'-chloro-phenyl ester, 3-amino-4-methyl-benzoic acid 3'-methyl-6'-chloro-phenyl ester, 3-amino-4-methyl-benzoic acid 4-acetylamino-phenyl ester, 3-amino-4-methyl-benzoic acidbenzyl ester, 3-amino-4-methyl-benzoic acid 4'-methoxy-benzyl ester, 3-amino-4-methyl-benzoic acid β-naphthyl ester, 3-amino-4-methyl-benzoic acid β-naphthyl ester, 3-amino-4-methyl-benzoic acid tetrahydro-β-naphthyl ester, 3-amino-4-methyl-benzoic acid 3'-oxy-pyridine ester and 3-amino-4-methyl-benzoic acid 4'-phenyl-phenyl ester.

The coupling components used are preferably those of the formula

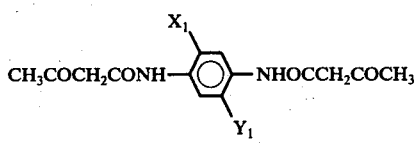

wherein $X_1$ and $Y_1$ have the indicated meaning.

These are known compounds which are obtained by the action of diketene or acetoacetic acid esters on the corresponding phenylenediamines, such as, for example: 1,4-Phenylenediamine, 2-chloro-1,4-phenylenediamine, 2-cyano-1,4-phenylenediamine, 2-methyl-1,4- phenylenediamine, 2-methoxy-1,4-phenylenediamine, 2-phenoxy-1,4-phenylenediamine, 2-nitro-1,4-phenylenediamine, 2-methoxycarbonyl-1,4-phenylenediamine, 2-ethoxycarbonyl-1,4-phenylenediamine, 2,3-dichloro-1,4-phenylenediamine, 2,5-dichloro-1,4-phenylenediamine, 2,6-dichloro-1,4-phenylenediamine, 2-chloro-5-methyl-1,4-phenylenediamine, 2-chloro-5-methoxy-1,4-phenylenediamine, 2,5-dimethyl-1,4-phenylenediamine, 2-methyl-5-methoxy-1,4-phenylenediamine, 2,5-dimethoxy-1,4-phenylenediamine, 2,5-diethoxy-1,4-phenylenediamine, 2-methoxy-5-ethoxy-1,4-phenylenediamine, 2,3,5-trichloro-1,4-phenylenediamine, 2,3,5,6-tetrachloro-1,4-phenylenediamine, 2,5-dimethyl-3,6-dichloro-1,4-phenylenediamine, 1,3-phenylenediamine, 4-chloro-1,3-phenylenediamine, 2-methyl-1,3-phenylenediamine, 4-methyl-1,3-phenylenediamine, 4-methoxy-1,3-phenylenediamine, 2,4-dichloro-1,3-phenylenediamine, 2,5-dichloro-1,3-phenylenediamine, 4,6-dichloro-1,3-phenylenediamine, 4,6-dimethyl-1,3-phenylenediamine, 2,6-dimethyl-1,3-phenylenediamine, 1,4-naphthylenediamine, 1,5-naphthylenediamine, 2,6-naphthylenediamine and 2,3,5,6-tetramethyl-1,4-phenylenediamine.

The coupling preferably taken place in a weakly acid medium, suitably in the presence of customary agents which promote coupling. As such there may in particular be mentioned dispersing agents, for example aralkylsulphonates, such as dodecylbenzenesulphonate or 1,1'-dinaphthylmethane-2,2'-disulphonic acid or polycondensation products of alkylene oxides. The dispersion of the coupling component can also advantageously contain protective colloids, for example methylcellulose or minor amounts of inert, sparingly water-soluble or water-insoluble organic solvents, for example optionally halogenated or nitrated aromatic hydrocarbons such as benzene, toluene, xylene, chlorobenzene, dichlorobenzene or nitrobenzene, as well as aliphatic halogenated hydrocarbons such as, for example, carbon tetrachloride, or trichloroethylene, and also water-miscible organic solvents such as acetone, methyl ethyl ketone, methanol, ethanol or isopropanol. The coupling can also be carried out advantageously by continuously combining an acid solution of the diazonium salt with an alkaline solution of the coupling component in a mixing nozzle, whereupon immediate coupling of the components takes place. It is necessary to ensure that the diazo component and the coupling component are present in equimolecular amounts in the mixing nozzle and it has proved advantageous to use a light excess of the diazo component. This is most simply effected by controlling the pH value of the liquid in the mixing nozzle. Vigorous turbulent mixing of the two solutions must also be ensured in the mixing nozzle. The resulting dyestuff dispersion is continuously withdrawn from the mixing nozzle and the dyestuff is isolated by filtration.

By virtue of their insolubility, the pigments obtained can be isolated from the reaction mixtures by filtration. It proves to be advantageous to after-treat the resulting pigments with an organic solvent which, preferably, boils above 100° C. Solvents which prove to be particularly suitable are benzenes substituted by halogen atoms or alkyl or nitro groups, such as xylenes, chlorobenzene, o-dichlorobenzene or nitrobenzene, as well as pyridine bases, such as pyridine, picoline or quinoline, and also ketones, such as cyclohexanone, ethers, such as ethylene glycol monomethyl ether or monoethyl ether, amides, such as dimethylformamide or N-methyl-pyrrolidone, as well as sulphoxone.

The after-treatment is preferably carried out by heating the pigment in the solvent to 100° – 150° C, whereupon in many cases a coarsening of the particle size occurs, which has a favourable influence on the fastness to light and to migration of the pigments obtained.

Finally, the coupling can also be effected by suspending the amine to be diazotised together with the coupling component, in the molar ratio of 2:1, in an organic solvent, and treating the mixture with a diazotising agent, especially an ester of nitrous acid, such as methyl nitrite, ethyl nitrite, butyl nitrite, amyl nitrite or octyl nitrite.

The new dyestuffs are valuable pigments which can be used, in a finely divided form, for pigmenting high molecular organic material, for example cellulose ethers and cellulose esters, such as ethylcellulose, cellulose acetate and cellulose butyrate, natural resins or synthetic resins, such as polymerisation resins or condensation resins, for example aminoplasts, especially urea-formaldehyde and melamineformaldehyde resins, alkyd resins, phenoplasts, polycarbonates, polyesters, polyamides or polyurethanes, polyolefines, such as polyethylene or polypropylene, polyvinyl chloride, polystyrene, polyacrylonitrile, polyacrylic acid esters, rubber, casein, silicone and silicone resins, individually or as mixtures.

It is immaterial whether the high molecular compounds mentioned are in the form of plastic masses or melts or in the form of spinning solutions, lacquers, paints or printing inks. Depending on the end use, it proves advantageous to use the new pigments as toners or in the form of preparations.

The preparations can contain, for example, the pure pigment together with natural resins, for example abietic acid or its esters, ethylcellulose, cellulose acetobutyrate, alkaline earth metal salts or higher fatty acids, fatty amines, for example stearylamine or rosin amine, vinyl chloride/vinyl acetate copolymers, polyacrylonitrile or polyterpene resins, or water-soluble dyestuffs, for example dyestuff-sulphonic acids or their alkaline earth metal salts.

As compared to the nearest comparable dyestuffs of DS-OS 2,103,765, the dyestuffs according to the invention are distinguished by greater tinctorial strength.

In the examples which follow, the parts, unless stated otherwise, denote parts by weight and the percentages denote percentages by weight.

EXAMPLE 1

6.6 parts of 3-amino-4-methyl-benzoic acid methyl ester in 200 parts by volume of glacial acetic acid are stirred with 10 parts by volume of concentrated hydrochloric acid, whereupon the hydrochloride of the base forms. The mixture is then cooled to −5° C by adding 300 parts of ice and is diazotised by adding 10.5 parts by volume of 4 N sodium nitrite. The yellow diazo solution is stirred at 0°–5° C until only traces of nitrous acid are detectable. The diazo solution is then clarified by filtration with addition of a little decolourising charcoal. The filtrate is brought to pH 4 by adding 48 parts of anhydrous sodium acetate.

At the same time, 6.2 parts of 2-methoxy-5-chloro-1,4-bis-acetoacetylaminobenzene are dissolved in 150 parts of water by addition of 38 parts by volume of 4% strength sodium hydroxide solution, and 2 parts of n-butyl-sulphoricinoleate are added. This solution is clarified by filtration using 0.5 part of decolourising charcoal and is then added dropwise to the diazo solution over the course of 1-1½ hours, with good stirring. In the course thereof, the temperature of the reaction mixture rises to 15°-20° C. After completion of the dropwise addition, diazo compound can no longer be detected in the mixture. The mixture is stirred for 1 hour at room temperature, then warmed to 80° - 85° C over the course of 1 hour and filtered hot, and the filter residue is washed with hot water until free of salt. After drying at 95° - 100° C in vacuo, 11.9 parts of a yellow dyestuff of the formula

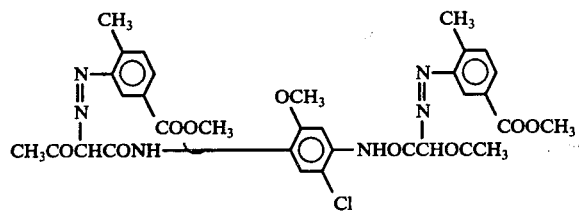

are obtained.

10 parts of the pigment thus obtained are stirred for 200 parts by volume of cellosolve for 18 hours at 145°-150° C. In the course thereof, the dyestuff assumes a uniform crystalline form. Fine yellow particles of 5 μ length are detectable under the microscope. The product is filtered off at 140° C and washed with boiling cellosolve until the filtrate issues colourless, the cellosolve is then displaced by dimethylformamide and finally the product is again washed with ethanol. After drying, 8 parts of a luminous yellow pigment dyestuff are obtained. This colours plastics such as PVC in greenish-tinged yellow shades of excellent fastness to migration. The treatment in the organic solvent can also be effected directly using the moist filter cake, without prior drying. Thus the moist press cake can be stirred in picoline at 100° - 120° C, filtered off and washed with methanol and subsequently with dilute hydrochloric acid, or the moist press cake is stirred in chlorobenzene, o-dichlorobenzene or nitrobenzene, freed from water by azeotropic distillation and then worked up as described above.

The table which follows describes further dyestuffs which are obtained by coupling the diazotised bases of column I with the bis-acetoacetic acid arylides of the diamines of column II. Column III indicates the colour shade of a PVC film coloured with 0.2% of these pigments.

| Example No. | Diazo base | Bis-acetoacetyl compound of the diamine | Colour produced by 0.2% in PVC |
|---|---|---|---|
| 2 | 3-Amino-4-methyl-benzoic acid methyl ester | 1,4-Phenylenediamine | Yellow |
| 3 | " | 2-Chloro-1,4-phenylenediamine | " |
| 4 | " | 2-Cyano-1,4-phenylenediamine | " |
| 5 | " | 2-Methyl-1,4-phenylenediamine | " |
| 6 | " | 2-Methoxy-1,4-phenylenediamine | " |
| 7 | " | 2-Nitro-1,4-phenylenediamine | " |
| 8 | " | 2,5-Dichloro-1,4-phenylenediamine | " |
| 9 | " | 2,6-Dichloro-1,4-phenylenediamine | " |
| 10 | " | 2-Chloro-5-methyl-1,4-phenylenediamine | " |
| 11 | " | 2,5-Dimethyl-1,4-phenylenediamine | " |
| 12 | " | 2-Methyl-5-methoxy-1,4-phenylenediamine | Orange |
| 13 | " | 2,5-Dimethoxy-1,4-phenylenediamine | " |
| 14 | " | 2,3,5,6-Tetrachloro-1,4-phenylenediamine | Yellow |
| 15 | " | 1,3-Phenylenediamine | " |
| 16 | " | 4-Chloro-1,3-phenylenediamine | " |
| 17 | " | 4-Methyl-1,3-phenylenediamine | " |
| 18 | " | 4-Methoxy-1,3-phenylenediamine | " |
| 19 | 3-Amino-4-methyl-benzoic acid ethyl ester | 1,4-Phenylenediamine | Light yellow |
| 20 | " | 2-Chloro-1,4-phenylenediamine | Yellow |
| 21 | " | 2-Methyl-1,4-phenylenediamine | " |
| 22 | " | 2,5-Dichloro-1,4-phenylenediamine | Green-yellow |
| 23 | " | 2-Chloro-5-methoxy-phenylenediamine | Yellow |
| 24 | " | 2-Chloro-5-methyl-1,4-phenylenediamine | " |
| 25 | " | 2,5-Dimethyl-1,4-phenylenediamine | Reddish-yellow |
| 26 | " | 1,3-Phenylenediamine | Yellow |
| 27 | 3-Amino-4-methyl-benzoic acid n-propyl ester | 1,4-Phenylenediamine | " |
| 28 | " | 2-Chloro-1,4-phenylenediamine | " |
| 29 | " | 2-Methyl-1,4-phenylenediamine | " |
| 30 | " | 2,5-Dichloro-1,4-phenylenediamine | " |
| 31 | " | 2-Chloro-5-methoxy-1,4-phenylenediamine | " |
| 32 | " | 2-Chloro-5-methyl-1,4-phenylenediamine | " |
| 33 | " | 2,5-Dimethyl-1,4-phenylenediamine | Reddish-yellow |
| 34 | 3-Amino-4-methyl-benzoic acid iso-propyl ester | 1,4-Phenylenediamine | Yellow |
| 35 | " | 2-Chloro-1,4-phenylenediamine | " |
| 36 | " | 2-Cyano-1,4-phenylenediamine | " |
| 37 | " | 2-Methyl-1,4-phenylenediamine | " |
| 38 | " | 2-Methoxy-1,4-phenylenediamine | " |
| 39 | " | 2-Nitro-1,4-phenylenediamine | " |
| 40 | " | 2,5-Dichloro-1,4-phenylenediamine | " |
| 41 | " | 2,6-Dichloro-1,4-phenylenediamine | " |
| 42 | " | 2-Chloro-5-methyl-1,4-phenylenediamine | " |
| 43 | " | 2-Chloro-5-methoxy--phenylenediamine | " |
| 44 | " | 2,5-Dimethyl-1,4-phenylenediamine | Orange-yellow |
| 45 | " | 2-Methyl-5-methoxy-1,4-phenylenediamine | Yellow |
| 46 | " | 2,5-Dimethoxy-1,4-phenylenediamine | Orange |
| 47 | " | 2,3,5,6-Tetrachloro-1,4-phenylenediamine | Yellow |
| 48 | " | 1,3-Phenylenediamine | " |
| 49 | " | 4-Chloro-1,3-phenylenediamine | " |
| 50 | " | 4-Methyl-1,3-phenylenediamine | " |
| 51 | " | 4-Methoxy-1,3-phenylenediamine | " |
| 52 | 3-Amino-4-methyl-benzoic acid n-butyl ester | 1,4-Phenylenediamine | " |

-continued

| Example No. | Diazo base | Bis-acetoacetyl compound of the diamine | Colour produced by 0.2% in PVC |
|---|---|---|---|
| 53 | " | 2-Chloro-1,4-phenylenediamine | " |
| 54 | " | 2-Chloro-5-methoxy-1,4-phenylenediamine | " |
| 55 | 3-Amino-4-methyl-benzoic acid tert.butyl ester | 1,4-Phenylenediamine | " |
| 56 | " | 2-Chloro-1,4-phenylenediamine | " |
| 57 | " | 2-Chloro-5-methoxy-1,4-phenylenediamine | " |
| 58 | " | 1,3-Phenylenediamine | " |
| 59 | 3-Amino-4-methyl-benzoic acid β-chloroethyl ester | 1,4-Phenylenediamine | " |
| 60 | " | 2-Chloro-1,4-phenylenediamine | " |
| 61 | " | 2-Methyl-1,4-phenylenediamine | " |
| 62 | " | 2,5-Dichloro-1,4-phenylenediamine | " |
| 63 | " | 2-Chloro-5-methoxy-1,4-phenylenediamine | " |
| 64 | " | 2-Chloro-5-methyl-1,4-phenylenediamine | " |
| 65 | " | 2,5-Dimethyl-1,4-phenylenediamine | Orange |
| 66 | 3-Amino-4-methyl-benzoic acid γ-chloropropyl ester | 1,4-Phenylenediamine | Yellow |
| 67 | " | 2-Chloro-1,4-phenylenediamine | " |
| 68 | " | 2-Methyl-1,4-phenylenediamine | " |
| 69 | " | 2,5-Dichloro-1,4-phenylenediamine | " |
| 70 | " | 2-Chloro-5-methoxy-1,4-phenylenediamine | " |
| 71 | " | 2-Chloro-5-methyl-1,4-phenylenediamine | " |
| 72 | " | 2,5-Dimethyl-1,4-phenylenediamine | " |
| 73 | " | 1,3-Phenylenediamine | " |
| 74 | 3-Amino-4-methyl-benzoic acid allyl ester | 1,4-Phenylenediamine | " |
| 75 | " | 2-Chloro-1,4-phenylenediamine | " |
| 76 | " | 2-Chloro-5-methoxy-1,4-phenylenediamine | " |
| 77 | 3-Amino-4-methyl-benzoic acid phenyl ester | 1,4-Phenylenediamine | " |
| 78 | " | 2-Chloro-1,4-phenylenediamine | " |
| 79 | " | 2-Cyano-1,4-phenylenediamine | " |
| 80 | " | 2-Methyl-1,4-phenylenediamine | " |
| 81 | " | 2-Methoxy-1,4-phenylenediamine | Orange-yellow |
| 82 | " | 2-Nitro-1,4-phenylenediamine | " |
| 83 | " | 2,5-Dichloro-1,4-phenylenediamine | " |
| 84 | " | 2,6-Dichloro-1,4-phenylenediamine | " |
| 85 | " | 2-Chloro-5-methyl-1,4-phenylenediamine | " |
| 86 | " | 2-Chloro-5-methoxy-1,4-phenylenediamine | " |
| 87 | " | 2,5-Dimethyl-1,4-phenylenediamine | " |
| 88 | " | 2-Methyl-5-methoxy-1,4-phenylenediamine | Orange |
| 89 | " | 2,5-Dimethoxy-1,4-phenylenediamine | " |
| 90 | " | 2,3,5,6-Tetrachloro-1,4-phenylenediamine | Yellow |
| 91 | " | 1,3-Phenylenediamine | " |
| 92 | " | 4-Chloro-1,3-phenylenediamine | " |
| 93 | " | 4-Methyl-1,3-phenylenediamine | " |
| 94 | " | 4-Methoxy-1,3-phenylenediamine | Orange |
| 95 | 3-Amino-4-methyl-benzoic acid 2'-chlorophenyl ester | 1,4-Phenylenediamine | Yellow |
| 96 | " | 2-Chloro-1,4-phenylenediamine | " |
| 97 | " | 2-Chloro-5-methoxy-1,4-phenylenediamine | " |
| 98 | " | 1,3-Phenylenediamine | " |
| 99 | 3-Amino-4-methyl-benzoic acid 3'-chlorophenyl ester | 1,4-Phenylenediamine | " |
| 100 | " | 2-Chloro-1,4-phenylenediamine | " |
| 101 | " | 2-Chloro-5-methoxy-phenylenediamine | " |
| 102 | " | 1,3-Phenylenediamine | " |
| 103 | 3-Amino-4-methyl-benzoic acid 4'-chlorophenyl ester | 1,4-Phenylenediamine | " |
| 104 | " | 2-Chloro-1,4-phenylenediamine | " |
| 105 | " | 2,5-Dichloro-1,4-phenylenediamine | " |
| 106 | " | 2-Chloro-5-methoxy-1,4-phenylenediamine | " |
| 107 | " | 2-Chloro-5-methyl-1,4-phenylenediamine | " |
| 108 | " | 1,3-Phenylenediamine | " |
| 109 | 3-Amino-4-methyl-benzoic acid 4'-bromophenyl ester | 1,4-Phenylenediamine | " |
| 110 | " | 2-Chloro-1,4-phenylenediamine | " |
| 111 | " | 2-Chloro-5-methoxy-1,4-phenylenediamine | " |
| 112 | 3-Amino-4-methyl-benzoic acid 2',4'-dichlorophenyl ester | 1,4-Phenylenediamine | " |
| 113 | " | 2-Chloro-1,4-phenylenediamine | " |
| 114 | " | 2,5-Dichloro-1,4-phenylenediamine | " |
| 115 | " | 2-Chloro-5-methoxy-1,4-phenylenediamine | " |
| 116 | " | 2-Chloro-5-methyl-1,4-phenylenediamine | " |
| 117 | " | 1,3-Phenylenediamine | " |
| 118 | 3-Amino-4-methyl-benzoic acid 2',4',5'-tri-chlorophenyl ester | 1,4-Phenylenediamine | Light yellow |
| 119 | " | 2-Chloro-1,4-phenylenediamine | " |
| 120 | " | 2-Methyl-1,4-phenylenediamine | " |
| 121 | " | 2-Methoxy-1,4-phenylenediamine | Reddish yellow |
| 122 | " | 2,5-Dichloro-1,4-phenylenediamine | Yellow |
| 123 | " | 2-Chloro-5-methoxy-1,4-phenylenediamine | " |
| 124 | " | 2-Chloro-5-methyl-1,4-phenylenediamine | " |
| 125 | " | 2,5-Dimethyl-1,4-phenylenediamine | " |
| 126 | " | 2-Methyl-5-methoxy-1,4-phenylenediamine | " |
| 127 | " | 2,5-Dimethoxy-1,4-phenylenediamine | Orange |
| 128 | " | 1,3-Phenylenediamine | Yellow |
| 129 | " | 4-Chloro-1,3-phenylenediamine | " |
| 130 | 3-Amino-4-methyl-benzoic acid 2',4',6'-trichloro- | 1,4-phenylenediamine | " |

-continued

| Example No. | Diazo base | Bis-acetoacetyl compound of the diamine | Colour produced by 0.2% in PVC |
|---|---|---|---|
| 131 | phenyl ester " | 2-Chloro-1,4-phenylenediamine | " |
| 132 | " | 2-Chloro-5-methoxy-1,4-phenylenediamine | " |
| 133 | " | 1,3-Phenylenediamine | " |
| 134 | 3-Amino-4-methyl-benzoic acid 2',3',4',5',6'-pentachloro-phenyl ester | 1,4-Phenylenediamine | " |
| 135 | " | 2-Chloro-1,4-phenylenediamine | " |
| 136 | " | 2-Cyano-1,4-phenylenediamine | " |
| 137 | " | 2-Methyl-1,4-phenylenediamine | " |
| 138 | " | 2-Methoxy-1,4-phenylenediamine | Reddish yellow |
| 139 | " | 2-Nitro-1,4-phenylenediamine | Yellow |
| 140 | " | 2,5-Dichloro-1,4-phenylenediamine | " |
| 141 | " | 2,6-Dichloro-1,4-phenylenediamine | " |
| 142 | " | 2-Chloro-5-methyl-phenylenediamine | " |
| 143 | " | 2-Chloro-5-methoxy-1,4-phenylenediamine | " |
| 144 | " | 2,5-Dimethyl-1,4-phenylenediamine | " |
| 145 | " | 2-Methyl-5-methoxy-1,4-phenylenediamine | " |
| 146 | " | 2,5-Dimethoxy-1,4-phenylenediamine | Orange |
| 147 | " | 2,3,5,6-Tetrachloro-1,4-phenylenediamine | " |
| 148 | " | 1,3-Phenylenediamine | " |
| 149 | " | 4-Chloro-1,3-phenylenediamine | " |
| 150 | " | 4-Methyl-1,3-phenylenediamine | " |
| 151 | " | 4-Methoxy-1,3-phenylenediamine | " |
| 152 | 3-Amino-4-methyl-benzoic acid 2'-methyl-phenyl ester | 1,4-Phenylenediamine | " |
| 153 | " | 2-Chloro-1,4-phenylenediamine | " |
| 154 | " | 2-5-Dichloro-1,4-phenylenediamine | " |
| 155 | " | 2-Chloro-5-methoxy-1,4-phenylenediamine | " |
| 156 | " | 2-Chloro-5-methyl-1,4-phenylenediamine | " |
| 157 | " | 1,3-Phenylenediamine | " |
| 158 | 3-Amino-4-methyl-benzoic acid 3'-methyl-phenyl ester | 1,4-Phenylenediamine | " |
| 159 | " | 2-Chloro-1,4-phenylenediamine | " |
| 160 | " | 2-Chloro-5-methoxy-1,4-phenylenediamine | " |
| 161 | " | 1,3-Phenylenediamine | " |
| 162 | 3-Amino-4-methyl-benzoic acid 4'-methyl-phenyl ester | 1,4-Phenylenediamine | " |
| 163 | " | 2-Chloro-1,4-phenylenediamine | " |
| 164 | " | 2-Chloro-5-methoxy-1,4-phenylenediamine | " |
| 165 | " | 1,3-Phenylenediamine | " |
| 166 | 3-Amino-4-methyl-benzoic acid 3',5'-dimethyl-phenyl-ester | 1,4-Phenylenediamine | " |
| 167 | " | 2-Chloro-1,4-phenylenediamine | " |
| 168 | " | 2-Chloro-5-methoxy-1,4-phenylenediamine | Yellow |
| 169 | " | 1,3-Phenylenediamine | " |
| 170 | 3-Amino-4-methyl-benzoic acid 4'-tert.butyl-phenyl ester | 1,4-Phenylenediamine | " |
| 171 | " | 2-Chloro-5-methyl-1,4-phenylenediamine | " |
| 172 | " | 2-Chloro-5-methoxy-1,4-phenylenediamine | " |
| 173 | " | 2,5-Dimethoxy-1,4-phenylenediamine | Orange |
| 174 | " | 1,3-Phenylenediamine | Yellow |
| 175 | 3-Amino-4-methyl-benzoic acid 4'-iso-amyl-phenyl ester | 1,4-Phenylenediamine | " |
| 176 | " | 2-Chloro-5-methyl-1,4-phenylenediamine | " |
| 177 | " | 2-Chloro-5-methoxy-1,4-phenylenediamine | " |
| 178 | " | 2,5-Dimethoxy-1,4-phenylenediamine | Orange |
| 179 | " | 1,3-Phenylenediamine | " |
| 180 | 3-Amino-4-methyl-benzoic acid 2'-methoxy-phenyl ester | 1,4-Phenylenediamine | " |
| 181 | " | 2-Chloro-1,4-phenylenediamine | " |
| 182 | " | 2-Methyl-1,4-phenylenediamine | " |
| 183 | " | 2,5-Dichloro-1,4-phenylenediamine | " |
| 184 | " | 2-Chloro-5-methoxy-1,4-phenylenediamine | " |
| 185 | " | 2-Chloro-5-methyl-1,4-phenylenediamine | " |
| 186 | " | 2,5-Dimethyl-1,4-phenylenediamine | Reddish yellow |
| 187 | 3-Amino-4-methyl-benzoic acid 4'-methoxy-phenyl ester | 1,4-Phenylenediamine | " |
| 188 | " | 2-Chloro-5-methyl-1,4-phenylenediamine | " |
| 189 | " | 2-Chloro-5-methoxy-1,4-phenylenediamine | " |
| 190 | " | 2,5-Dimethoxy-1,4-phenylenediamine | Orange |
| 191 | " | 1,3-Phenylenediamine | Yellow |
| 192 | 3-Amino-4-methyl-benzoic acid 2'-methyl-4'-chloro-phenyl ester | 1,4-Phenylenediamine | " |
| 193 | " | 2-Chloro-1,4-phenylenediamine | " |
| 194 | " | 2-Methyl-1,4-phenylenediamine | " |
| 195 | " | 2,5-Dichloro-1,4-phenylenediamine | " |
| 196 | " | 2-Chloro-5-methoxy-1,4-phenylenediamine | " |
| 197 | " | 2-Chloro-5-methyl-1,4-phenylenediamine | " |
| 198 | " | 2,5-Dimethyl-1,4-phenylenediamine | Reddish yellow |
| 199 | 3-Amino-4-methyl-benzoic acid 2'-methyl-6'-chloro-phenyl ester | 1,4-Phenylenediamine | " |
| 200 | " | 2-Chloro-5-methyl-1,4-phenylenediamine | " |
| 201 | " | 2-Chloro-5-methoxy-1,4-phenylenediamine | " |
| 202 | " | 2,5-Dimethoxy-1,4-phenylenediamine | Orange-yellow |
| 203 | " | 1,3-Phenylenediamine | " |
| 204 | 3-Amino-4-methyl-benzoic | 1,4-Phenylenediamine | " |

-continued

| Example No. | Diazo base | Bis-acetoacetyl compound of the diamine | Colour produced by 0.2% in PVC |
|---|---|---|---|
| | acid 3'-methyl-4'-chloro-phenyl ester | | |
| 205 | " | 2-Chloro-5-methyl-1,4-phenylenediamine | " |
| 206 | " | 2-Chloro-5-methoxy-1,4-phenylenediamine | " |
| 207 | " | 2,5-Dimethoxy-1,4-phenylenediamine | " |
| 208 | " | 1,3-Phenylenediamine | Yellow |
| 209 | 3-Amino-4-methyl-benzoic acid 3'-methyl-6'-chloro-phenyl ester | 1,4-Phenylenediamine | " |
| 210 | " | 2-Chloro-5-methoxy-1,4-phenylenediamine | " |
| 211 | " | 2-Chloro-5-methyl-1,4-phenylenediamine | " |
| 212 | " | 2,5-Dimethyl-1,4-phenylenediamine | Reddish yellow |
| 213 | " | 1,3-Phenylenediamine | Yellow |
| 124 | 3-Amino-4-methyl-benzoic acid 4'-acetylamino-phenyl ester | 1,4-Phenylenediamine | " |
| 215 | " | 2-Chloro-5-methyl-1,4-phenylenediamine | " |
| 216 | " | 2-Chloro-5-methoxy-1,4-phenylenediamine | " |
| 217 | " | 2,5-Dimethoxy-1,4-phenylenediamine | Reddish yellow |
| 218 | " | 1,3-Phenylenediamine | Yellow |
| 219 | 3-Amino-4-methyl-benzoic acid benzyl ester | 1,4-Phenylenediamine | " |
| 220 | " | 2-Chloro-1,4-phenylenediamine | " |
| 221 | " | 2-Methyl-1,4-phenylenediamine | " |
| 222 | " | 2-Methoxy-1,4-phenylenediamine | " |
| 223 | " | 2,5-Dichloro-1,4-phenylenediamine | " |
| 224 | " | 2-Chloro-5-methoxy-1,4-phenylenediamine | " |
| 225 | " | 2-Chloro-5-methyl-1,4-phenylenediamine | " |
| 226 | " | 2,5-Dimethyl-1,4-phenylenediamine | Orange-yellow |
| 227 | " | 2-Methyl-5-methoxy-1,4-phenylenediamine | Yellow |
| 228 | " | 2,5-Dimethoxy-1,4-phenylenediamine | Orange |
| 229 | " | 1,3-Phenylenediamine | Yellow |
| 230 | " | 4-Chloro-1,3-phenylenediamine | " |
| 231 | 3-Amino-4-methyl-benzoic acid 4'-methoxy-benzyl ester | 1,4-Phenylenediamine | " |
| 232 | " | 2-Chloro-1,4-phenylenediamine | " |
| 233 | " | 2-Methyl-1,4-phenylenediamine | " |
| 235 | " | 2,5-Dichloro-1,4-phenylenediamine | " |
| 236 | " | 2-Chloro-5-methoxy-1,4-phenylenediamine | " |
| 237 | " | 2-Chloro-5-methyl-1,4-phenylenediamine | " |
| 238 | " | 2,5-Dimethyl-1,4-phenylenediamine | Reddish-yellow |
| 239 | 3-Amino-4-methyl-benzoic acid α-naphthyl ester | 1,4-Phenylenediamine | Yellow |
| 240 | " | 2-Chloro-5-methyl-1,4-phenylenediamine | " |
| 241 | " | 2-Chloro-5-methoxy-1,4-phenylenediamine | " |
| 242 | " | 2,5-Dimethoxy-1,4-phenylenediamine | Orange |
| 243 | " | 1,3-Phenylenediamine | Yellow |
| 244 | 3-Amino-4-methyl-benzoic acid β-naphthyl ester | 1,4-Phenylenediamine | " |
| 245 | " | 2-Chloro-5-methoxy-1,4-phenylenediamine | " |
| 246 | " | 2-Chloro-5-methoxy-1,4-phenylenediamine | " |
| 247 | " | 2,5-Dimethoxy-1,4-phenylenediamine | " |
| 248 | " | 1,3-Phenylenediamine | " |
| 249 | 3-Amino-4-methyl-benzoic acid tetra-hydro-β-naphthyl ester | 1,4-Phenylenediamine | " |
| 250 | " | 2-Chloro-5-methyl-1,4-phenylenediamine | " |
| 251 | " | 2-Chloro-5-methoxy-1,4-phenylenediamine | " |
| 252 | " | 2,5-Dimethyl-1,4-phenylenediamine | Yellow |
| 253 | " | 1,3-Phenylenediamine | " |
| 254 | 3-Amino-4-methyl-benzoic acid 3'-oxy-pyridyl ester | 1,4-Phenylenediamine | " |
| 255 | " | 2-Chloro-1,4-phenylenediamine | " |
| 256 | " | 2-Methyl-1,4-phenylenediamine | " |
| 257 | " | 2,5-Dichloro-1,4-phenylenediamine | " |
| 258 | " | 2-Chloro-5-methoxy-1,4-phenylenediamine | " |
| 259 | " | 2-Chloro-5-methyl-1,4-phenylenediamine | " |
| 260 | " | 2,5-Dimethyl-1,4-phenylenediamine | Reddish yellow |
| 261 | " | 1,3-Phenylenediamine | Yellow |
| 262 | 3-Amino-4-methyl-benzoic acid 4'-phenyl-phenyl ester | 1,4-Phenylenediamine | " |
| 263 | " | 2-Chloro-1,4-phenylenediamine | " |
| 264 | " | 2-Methyl-1,4-phenylenediamine | " |
| 265 | " | 2,5-Dichloro-1,4-phenylenediamine | " |
| 266 | " | 2-Chloro-5-methoxy-1,4-phenylenediamine | " |
| 267 | " | 2-Chloro-5-methyl-1,4-phenylenediamine | " |
| 268 | " | 2,5-Dimethyl-1,4-phenylenediamine | Orange |
| 269 | " | 1,3-Phenylenediamine | " |

EXAMPLE 270

65 parts of stabilised polyvinyl chloride, 35 parts of dioctyl phthalate and 0.2 part of the dyestuff obtained according to Example 1, paragraph 2, are stirred together and then milled for 7 minutes on a two-roll cylinder at 140° C. A yellow-coloured film of very good fastness to light and to migration is obtained.

EXAMPLE 271

1.00 g of the pigment manufactured according to Example 1 and 4.00 g of printing varnish composed of 29.4% of linseed oil/stand oil (300 poise), 67.2% of linseed oil/stand oil (20 poise), 2.1% of cobalt octoate (8% of Co) and 1.3% of lead octoate (24% of Pb) are finely ground on an Engelsmann grinder and the product is then printed onto art printing paper by means of a block, using the letterpress printing process and applying 1 g/m². A strong, pure orange-tinged yellow shade of good transparency and good gloss is obtained. Very brilliant green shades can be produced in three-colour or four-colour printing through overprinting on blue.

The pigment is also suitable for other printing processes such as gravure printing, offset printing and flexographic printing and here again gives very good results.

What we claim is:

1. A disazo pigment of the formula

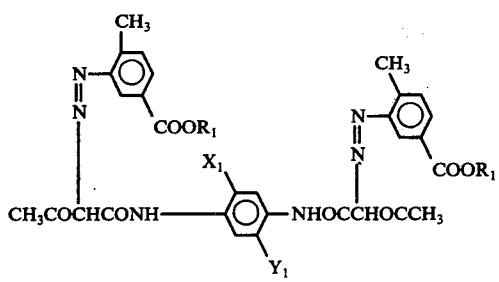

wherein $R_1$ is alkyl containing 1 to 6 carbon atoms; alkyl containing 1 to 6 carbon atoms substituted with chloro, or alkoxy containing 1 to 4 carbon atoms; cycloalkyl containing 5 to 6 carbon atoms; phenalkyl having 1 to 2 carbon atoms in the alkyl radical; phenyl; or phenyl substituted by chloro, bromo, alkyl containing 1 to 4 carbon atoms, alkoxy containing 1 to 4 carbon atoms, methoxycarbonyl, ethoxycabonyl or akoanoylamino containing 1 to 4 carbon atoms; $X_1$ is hydrogen; halogen; alkyl containing 1 to 4 carbon atoms; or alkoxy containing 1 to 4 carbon atoms; and $Y_1$ is hydrogen; halogen; alkyl containing 1 to 4 carbon atoms; or alkoxy containing 1 to 4 carbon atoms.

2. The compound according to claim 1 of the formula

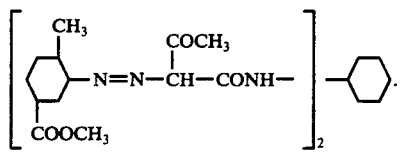

3. The compound according to claim 1 of the formula

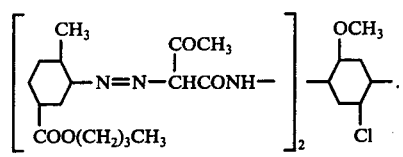

4. The compound according to claim 1 of the formula

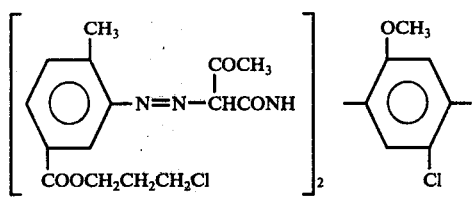

5. The compound according to claim 1 of the formula

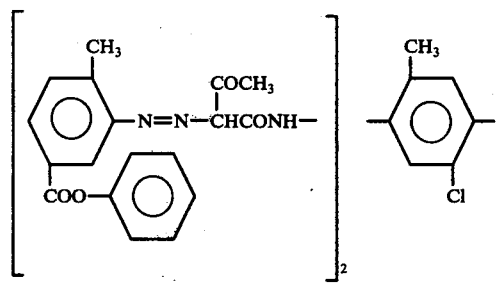

6. The compound according to claim 1 of the formula

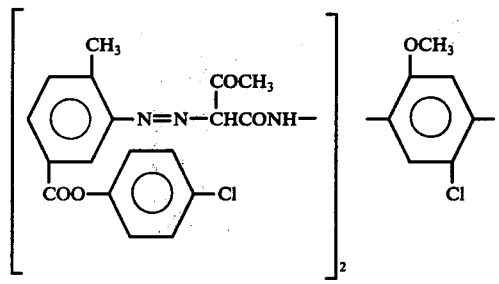

7. The compound according to claim 1 of the formula

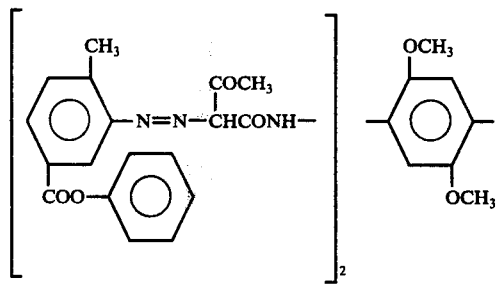

* * * * *